United States Patent Office 3,350,374
Patented Oct. 31, 1967

3,350,374
METHODS FOR PREPARING POLYMERS OF HYDROXYTETRAZOLE COMPOUNDS AND POLYMERS OF HYDRAZIDE OXIME COMPOUNDS, AND PRODUCTS
Charles Fetscher, Short Hills, and Stanley Lipowski, Livingston, N.J., assignors to Nopco Chemical Company, Newark, N.J., a corporation of New Jersey
No Drawing. Filed Apr. 30, 1963, Ser. No. 276,979
18 Claims. (Cl. 260—88.7)

The present invention relates to a new class of solid polymers. More particularly, the present invention relates to polyhydroxytetrazoles and valuable intermediates thereof including polyhydrazide oximes.

We have discovered a new and unique class of polymers, viz, polyhydroxytetrazoles which are characterized by their ability to form salts thus making them effective ion exchangers and characterized by the fact that they can be made to decompose vigorously with the evolution of copious quantities of gas thus making them useful in explosive compositions. Further, we have discovered safe and effective methods of making polyhydroxytetrazoles without ever preparing or using the potentially dangerous monomer, vinyl hydroxy tetrazole. Of particular advantage is the fact that all of the reactions from the hydroxamic acid to the tetrazoles are essentially quantitative.

Monomeric hydroxytetrazoles are known. Tetrazoles are, for the most part, unstable. Many of them decompose vigorously and exothermically. Perhaps because of this, polyvinyltetrazoles have been suggested for utilization in explosives and rocket fuel compositions. See United States Patent No. 3,004,959. These may be very useful, but they appear to be quite dangerous to make. The starting tetrazoles are exposed to various chemical stresses to generate the vinyl group and then to the rigors of vinyl polymerization. These chemical attacks upon the intrinsically unstable material would be expected, on occasion, to initiate the decomposition of the tetrazole with the destruction of the apparatus and hazard to the operators.

Our polyhydroxytetrazoles have several advantages over these prior art materials. The potentially dangerous tetrazole ring is not formed until the very last step. Moreover, the hydroxy tetrazole which contains a lower percentage of nitrogen than an unmodified tetrazole should be less unstable. It should not decompose as readily or as vigorously. Its reactiveness can be enhanced where necessary by converting it to a heavy metal salt. The oxygen content is advantageous in that less oxidizer is needed to make a stoichiometrically balanced explosive. The stable starting polymer, e.g., polyacrylonitrile, can be shaped or formed to some degree, i.e., to a fiber, film, granules, etc., before the chemical modifications are made. Further, the degree of conversion can easily be controlled to give a product containing as little as, e.g., 5% to as much as almost 100% of

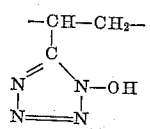

when a polyacrylonitrile is the starting material.
The tetrazole ring is numbered as follows:

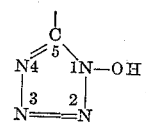

Thus, the hydroxy tetrazole substituent is referred to as 1-hydroxy, 5-tetrazole and the tetrazole ring is attached to the polymer at the 5 position.

The polyhydrazide oximes and the polyhydroxytetrazoles of this invention can be prepared in a most direct and economical manner from polyhydroxamic acids. The preparation of polyhydroxamic acids by hydrolyzing polyamidoximes with relatively cold hydrochloric acid is described in copending United States application Serial No. 136,748, Fetscher et al., filed September 8, 1961 while the preparation of polyamidoximes from nitrile containing polymers is described in copending United States application Serial No. 815,245, Fetscher, now Patent No. 3,088,798, and Serial No. 815,246, Fetscher, now Patent No. 3,088,799, both filed May 25, 1959. In brief, the polyhydroxamic acid is treated with thionyl chloride in at least stoichiometric amounts with respect to the hydroxamic acid groups present at temperatures of from about 10° C. to 70° C., thus forming polyhydroxamic chloride. This intermediate product is in turn reacted with hydrazine in approximately stoichiometric amounts with respect to the hydroxamic chloride substituents. Since reaction occurs vigorously at room temperature, the reaction mixture is preferably cooled to about 0° C. to 20° C. thereby converting this intermediate to polyhydrazide oxime. There is no need to use the dangerous and very expensive hydrazine inasmuch as hydrazine hydrate is perfectly operable. The polyhydrazide oxime, which has been found to be a powerful chelator, is treated with nitrous acid in amounts sufficient to convert the polyhydrazide oxime to the corresponding polyazide oxime, preferably with an aqueous solution of sodium nitrite and hydrochloric acid accompanied with cooling to about −5° C. to +10° C. A polyazide oxime forms which rearranges to the polyhydroxytetrazole.

The hydroxamic acid substituent has the following structure

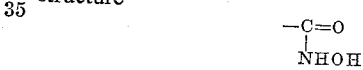

It is possible that in some instances the azide oxime formed by the action of nitrous acid upon the hydrazide oxime does not rearrange spontaneously to the hydroxytetrazole

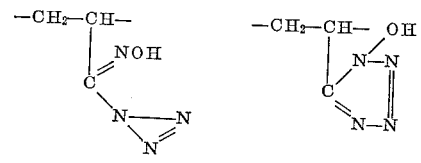

azide oxime　　　　hydroxytetrazole Normally an azide is a highly strained structure and would rearrange if possible. However, it is remotely possible that the azide is the stable isolatable isomer of this composition. It is unimportant for this invention which isomer exists. Each has a replaceable hydrogen atom and each has the unit composition $C_3H_4N_4O$ which contains 50% nitrogen. For convenience, the entity is referred to as a hydroxytetrazole and this name is intended for the composition $C_3H_4N_4O$, the product of the above reaction, even if all or part is in the isomeric form of an azide oxime.

The polymer can contain from about 11% to about 88% by weight of hydrazide oxime or hydroxytetrazole substituents depending on the initial concentration of amidoxime in the polymer.

We prefer from about 20% to about 80% by weight of the polymer of hydroxy tetrazole substituents, particularly when nitrogen generation is contemplated. When only partially converted, such as when using less than stoichiometric amounts of the aforesaid reactants, the polymer contains nitrile substituents as well. These nitrile substituents are present due to the fact that nitrile containing polymers are used in the preparation of the polyhydroxamic acid and part of these nitrile substituents may remain unreacted throughout the various reactions. Thus, when prepared from acrylonitrile, the polyhydroxytetrazoles can be represented by the following recurring structure in the case of complete or substantially complete conversion,

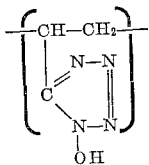

and represented by the following structure in the case of incomplete conversion of the nitrile substituent.

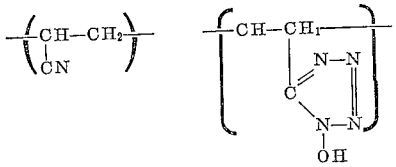

In the case of polyhydrazide oximes we prefer from about 10% to about 80% by weight of the polymer of hydrazide oxime substituents. When only partially converted, such as when using less than stoichiometric amounts of the aforesaid reactants, the polymer contains nitrile substituents as well. These nitrile substituents are present due to the fact that nitrile containing polymers are used in the preparation of the polyhydroxamic acid and part of these nitrile substituents may remain unreacted throughout the various reactions. Thus, when prepared from acrylonitrile the polyhydrazide oximes can be represented by the following recurring structure in the case of complete or substantially complete conversion,

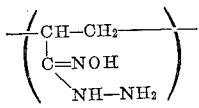

and represented by the following structure in the case of incomplete conversion of the nitrile substituent.

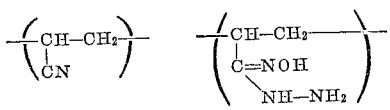

There are a great many types of nitrile containing resins or polymers which can be used in the present invention to serve as starting materials for the preparation of polyamidoximes which are then converted to polyhydroxamic acids, the polyhydrazide oximes and the polyhydroxytetrazoles. For example, the largest and most economically feasible group comprise the homopolymers and copolymers of acrylonitrile. In the copolymers, the comonomer may be one or more of the common ethylenically unsaturated monomers compolymerizable therewith such as styrene, butadiene, vinyl chloride, etc., including all the monomers which will copolymerize with acrylonitrile. A representative list appears on page 50 of the book "The Chemistry of Acrylonitrile" by the American Cyanamid Company (1951). The nitrile content essential for the formation of the amidoxime group can arise from other sources besides acrylonitrile. Polymers containing alpha-methacrylonitrile, fumaryl dinitrile or vinylidene cyanide or the like are perfectly satisfactory. It is only necessary that the homopolymer or copolymer thereof be water insoluble and resistant to the strong acid treatment and other treatments utilized in preparing the polyhydroxytetrazoles. It is preferred that the polymer contain at least about 10% by weight of nitrile for optimum effectiveness. Note that 10% by weight of nitrile (CN) is about 20% by weight of nitrile calculated as acrylonitrile. This means that in the case of copolymers of acrylonitrile, the non-nitrile comonomers, one or several, can total as much as 80% by weight of the final resin weight. Since the homopolymer is completely satisfactory, the comonomer content obviously can be zero. Thus, the composition of the resinous nitrile substrate can be from about 20% to 100% by weight of acrylonitrile or an equivalent weight of another nitrile containing monomer, e.g., alpha-methacrylonitrile, and 80% to 0% of one or more comonomers.

By "copolymer" we polymers obtained from the polymerization of acrylonitrile or other nitrile containing monomers with at least one other monomer copolymerizable therewith including cross-linking agents. Depending upon the process of polymerization, the copolymer may be characterized as random, alternating, graft or block copolymer. The term polymer as used herein includes both homopolymers and copolymers.

In general, the molecular weights of the polymers from which the polyhydrazide oximes and the polyhydroxytetrazoles are prepared in no way critical. They merely have to be high enough in molecular weight to be substantially insoluble in water and there is no upper limit. The commercially available acrylonitrile homopolymers and copolymers are all completely satisfactory. A particularly preferred class of materials are polymers and copolymers of acrylonitrile in fiber form. The commercially available so-called "acrylic" fibers in the form of fibers, yarns, woven and non-woven fabrics, etc., are eminently satisfactory as starting materials.

An additional type of nitrile containing polymer is the natural or synthetic polymer polymer which acrylonitrile has been added as a side chain on the polymer. It is, of course, necessary that the material be resistant to the acid treatments employed in preparing the polyhydroxytetrazoles and intermediates. For example, properly insolubilized polyvinyl alcohol which has been cyanoethylated to the extent of about 10% nitrile is a satisfactory starting resin.

It must be appreciated that generally not all of the nitrile substituents can be converted to polyhydrazide oximes and hydroxytetrazole substituents inasmuch as the nitrile substituents present in the inner portions of the resin are not exposed to the various reactants. The extent of this conversion appears to range up to about 80%.

There are many examples of the resinous materials described above which are available particularly in fibrous form to serve as a substrate for preparing our polyhydrazide oximes and polyhydroxytetrazoles. Several so-called acrylic fibers are available. These are all, save one, based upon acrylonitrile. The exception is based upon vinylidene cyanide and is a perfectly satisfactory alternative. The fibers listed below are all satisfactory for conversion to polyhydrazide oximes and polyhydroxytetrazoles.

| Fiber: | Composition |
|---|---|
| Orlon | >90% acrylonitrile. |
| Acrilan | >90% acrylonitrile. |
| Creslan | 95–96% acrylonitrile. |
| Zefran | >90% acrylonitrile. |
| Verel | About 50% acrylonitrile. |
| Dynel | {40% acrylonitrile- <br> {60% vinyl chloride. |
| Darlan | {50 mole percent vinylidene cyanide- <br> {50 mole percent vinyl acetate. |

The detailed compositions of a few additional and typical acrylonitrile polymers which are satisfactory for the production of the polyhydrazide oximes and polyhydroxytetrazoles are listed below. These are merely exemplary and are not to be construed as limited. The figures are the precents by weight of each monomer in the polymer.

90% acrylonitrile—10% vinylacetonitrile.
50% acrylonitrile—50% methacrylonitrile.
97% acrylonitrile—3% vinyl acetate.

50% acrylonitrile—50% vinyl acetate.
95% acrylonitrile—5% methyl methacrylate.
65% acrylonitrile—35% methyl acrylate.
45% acrylonitrile—10% methyl acrylate—45% vinyl acetate.
44% acrylonitrile—44% vinyl chloride—12% methyl acrylate.
93% acrylonitrile—7% 2-vinyl pyridine.
26% acrylonitrile—74% butadiene.
40% acrylonitrile—60% butadiene.
33% acrylonitrile—67% styrene.
100% acrylonitrile.

An alternative procedure for preparing polyhydroxytetrazoles involves polyesters as the starting materials. Useful polyesters are those having the following structures

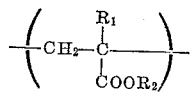

wherein $R_1$ can be hydrogen or a straight or branched chain hydrocarbon radical having from one to 4 carbon atoms such as methyl, ethyl propyl and butyl and $R_2$ is a straight or branched chain hydrocarbon radical having from one to 18 carbon atoms such as methyl, ethyl, butyl, 2-ethylhexyl, octyl, lauryl and stearyl. The preparation of these polyesters from their monomers such as methyl acrylate, ethyl acrylate, 2-ethylhexyl acrylate, methyl methacrylate, butyl methacrylate, lauryl methacrylate, etc., is well known.

When a polyester is used to prepare the polyhydroxytetrazole, it is first reacted with hydroxylamine in at least stoichiometric amounts with respect to the ester groups in an inert solvent at temperatures of from 20° C. to 60° C., thus forming polyhydroxamic acid. The polyhydroxamic acid can then be reacted as indicated above to form the polyhydroxytetrazole. Regarding the molecular weights of the polyesters, they are in no way critical. They merely have to be high enough in molecular weight to be substantially insoluble in water and there is no upper limit.

More specifically, the polyhydroxamic acid, whether from a polyamidoxime or a polyester is then converted to the polyhydroxamic chloride by reaction with at least stoichiometric amounts of thionyl chloride with respect to the hydroxamic acid groups present at temperatures of from about 10° C. to 70° C.

The polyhydroxamic chloride may be reacted with hydrazine as indicated before or alternately with stoichiometric amounts of sodium azide at, e.g., 0° C. to 20° C. to give the oxime azide directly which then rearranges to the hydroxy tetrazole. This is a perfectly operable path. However, it is not preferred inasmuch as the use of sodium azide is hazardous.

The starting polymers referred to above can be in the form of granules, fibers, yarns, woven or non-woven fabrics, etc. so that the final polyhydroxytetrazole will likewise be in the form of granules, fibers, yarns, woven or non-woven fabrics, etc.

The following examples illustrate this invention, but are not to be construed in a limiting way.

EXAMPLE I

A.—*Preparation of polyacrylohydroxamic chloride*

Ten grams of a polyacrylohydroxamic acid resin, containing 50% by weight of hydroxamic acid substituents and prepared from polyacrylonitrile of molecular weight of about 130,000 in the form of a fine powder was dispersed in 50 cc. of chloroform. To this was added 17 cc. of thionyl chloride dissolved in 35 cc. of chloroform. The temperature rose to 40° C., whereupon heat was applied and the reaction mass refluxed for one hour. Fumes of hydrogen chloride escaped slowly. After an initial reflux for one hour, an additional 17 cc. of thionyl chloride were added to the reaction mass and refluxing for 4 hours was carried out. Reflux temperature was 67° C. After refluxing, the reaction mass was cooled down and the resulting powder which was polyacrylohydroxamic chloride was filtered off and washed with ethanol.

B.—*Preparation of polyacrylohydrazide oxime*

The polyacrylohydroxamic chloride of part A was dispersed in 50 cc. of ethanol. To this, 10 cc. of hydrazine hydrate (85% hydrazine) were added accompanied with ice cooling.

The reaction mixture was stirred for one-half hour after which the corresponding polyacrylohydrazide oxime which formed was filtered off and washed with water.

C.—*Preparation of polyacrylohydroxytetrazole*

The wet mass of polyacrylohydrazide oxime of part B was dispersed in 250 cc. of a 2.5% aqueous hydrochloric acid solution and cooled down to 2° C. Four grams of sodium nitrite dissolved in 50 cc. of ice water were added with cooling. The temperature during reaction was maintained at 2° C. by cooling. The resulting yellow precipitate which was polyacrylohydroxytetrazole was filtered and air dried. When dry it was a yellow powder weighing 11.0 grams. The amount of hydroxytetrazole substituents was 55% by weight of the polyacrylohydroxytetrazole.

The polyacrylohydroxytetrazole forms a dispersion in water and is strongly acidic (pH=2.5 for 0.5 grams in 10 grams of water). It forms salts with copper and silver which are explosive.

EXAMPLE II

A.—*Preparation of polyhydroxamic acid from a polyester*

20 grams of Lucite 2041, a high molecular weight methyl methacrylate polymer, was dissolved in 400 cc. of dimethylformamide under heating. 14 grams of hydroxylammonium chloride were dissolved in 70 cc. of methanol and reacted with a solution of 25 grams potassium hydroxide under cooling. The precipitated potassium chloride was filtered off and the resulting hydroxylamine solution added to the polymer solution. The mixture was heated to 55° C. and stirred for 4 hours. The solution turned hazy. Then 50 cc. of glacial acetic acid were added and the solution stirred for 10 minutes. The solution became clear. The mixture was then dropped into 1½ liters of cold water whereupon the polymethacrylohydroxamic acid precipitated from the solution. The polymethacrylohydroxamic acid was filtered, washed with water and methanol and air dried. The yield was 18 grams. The product gave a strong cherry red color with ferric salts.

B.—*Preparation of polymethacrylohydroxamic chloride*

8.5 grams of the polymethacrylohydroxamic acid from part A above were ground to a fine powder and suspended in 50 cc. chloroform. 25 cc. thionyl chloride were added and the mixture stirred for 4 hours, at 30° C. The chloroform was then removed in vacuum, the unreacted thionyl chloride was destroyed by boiling with 10 cc. ethanol. The polymethacrylohydroxamic chloride was recovered as a white solid.

C.—*Preparation of polymethacrylohydrazide oxime*

The polymethacrylohydroxamic chloride was dissolved in 75 cc. dioxane cooled down to 0° C. and 5 cc. hydrazine hydrate was added. The mixture was stirred for one-half hour. 500 cc. water was added, the solids filtered and washed. The recovered product was polymethylacrylohydrazide oxime.

D.—*Preparation of polymethacrylohydroxytetrazole*

The polymethacrylohydrazide oxime was air dried, ground to a powder and suspended in a 4% hydrochloric acid solution. The suspension was cooled down to 0° C. and a solution of 20 grams of sodium nitrate in 50 grams water was added under ice cooling. The mixture was stirred for one hour. The resulting polymethylacrylohydroxytetrazole was filtered off and air dried.

EXAMPLE III

A.—Preparation of polyacryloamidoxime

The polyacryloamidoxime resin was prepared from polyacrylonitrile of molecular weight of about 130,000 by reacting it for about five hours in a methanol system with hydroxylamine in a mol ratio of 1:1 at 60° C.

B.—Preparation of polyacrylohydroxamic acid 20 grams of the polyacryloamidoxime of part A were treated with 50 cc. concentrated hydrochloric acid at 10° C. under cooling for 2 minutes. 200 cc. ice water was added and the polyacrylohydroxamic acid was filtered off immediately. The product was air dried and ground to a fine powder.

C.—Preparation of polyacrylohydroxytetrazole

The polyacrylohydroxamic acid was converted to a polyacrylohydroxytetrazole in the same manner as the polymethacrylohydroxamic acid was in Example II.

EXAMPLE IV

Reactions of the polyhydrazide oximes and the polyhydroxytetrazoles (A) The polyhydrazide oximes made from the polymethacrylohydroxamic acid and the polyacrylohydroxamic acid were each immersed in a 1% by weight copper sulfate solution. The compounds turned green in color due to chelation with copper. The chelated copper polymers were regenerated by acid elution, e.g., with 5% sulfuric acid solution.

The polyhydroxytetrazoles made from the polyhydrazide oximes demonstrated a fairly strong acid reaction when suspended in water (pH about 2.5). They exchange, when dispersed in water, silver, copper, and iron from their water soluble salts.

(B) 0.5 gram samples of the polyhydroxytetrazoles prepared above were each immersed in a copper sulfate solution thus forming their green copper salt. After filtration and air drying, several milligrams of each of the copper salts were transferred to a test tube and heated carefully in the presence of air. The copper salts disintegrated violently under heating.

Having described our invention, what we claim as new and desire to secure by Letters Patent is:

1. A polymer having a plurality of

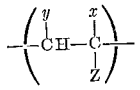

groups wherein:

$x$ is selected from the group consisting of H, CN, hydrocarbon substituents having from 1 to 4 carbon atoms and

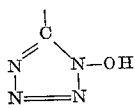

$y$ is selected from the group consisting of H, CN and

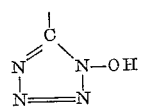

and Z is selected from the group consisting of CN, OCH$_2$CH$_2$CN and

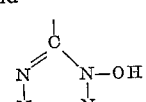

with the proviso that (a) no more than two of $x$, $y$ and Z are CN and (b) when $x$ is a hydrocarbon substituent having from 1 to 4 carbon atoms, $y$ is H, there being present from about 11% to about 88% by weight of said polymer of

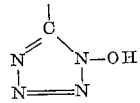

2. A polymer having a plurality of

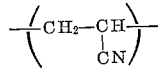

groups, said polymer having some of said CN substituents converted to

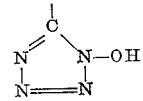

substituents, there being present from about 20% to about 80% by weight of said

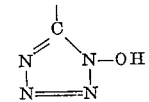

substituents.

3. A process comprising the steps of
(1) bringing together and reacting a polymeric unit defined by the following structure

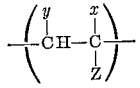

wherein $x$ is selected from the group consisting of H, CN

and hydrocarbon substituents having from 1 to 4 carbon atoms; $y$ is selected from the group consisting of H, CN, and

and Z is selected from the group consisting of CN, OCH$_2$CH$_2$CN and

with the proviso that (a) no more than two of $x$, $y$ and Z are CN and (b) when $x$ is a hydrocarbon substituent having from 1 to 4 carbon atoms, $y$ is H, there being present in said polymer from about 11% to about 88% by weight of said polymer of

substituents, and thionyl chloride at temperatures between about 10° C. and 70° C. in at least stoichiometric quantities thereby forming the corresponding polyhydroxamic chloride,
(2) bringing together and reacting the resulting polyhydroxamic chloride and a member of the group consisting of hydrazine and hydrazine hydrate at temperatures between about 0° C. and 20° C. in approximately stoichiometric quantities thereby forming the corresponding polyhydrazide oxime, and thereafter (3) bringing together and reacting the resulting polyhydrazide oxime with nitrous acid at temperatures between about −5° C. to +10° C. thereby obtaining the corresponding poly 1-hydroxy, 5-tetrazole.

4. A polyester having a plurality of

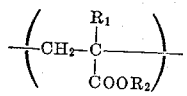

groups wherein $R_1$ is selected from the group consisting of hydrogen and hydrocarbon radicals having from one to four carbon atoms and $R_2$ is a hydrocarbon radical having from one to 18 carbon atoms, at least some of said —$COOR_2$ substituents being converted to

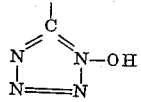

substituents, there being present from about 11% to about 88% by weight of said polymer of

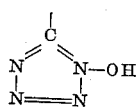

substituents.

5. A polymer having a plurality of

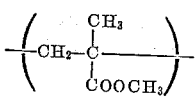

groups wherein some of said —$COOCH_3$ substituents have been converted to

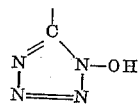

substituents, there being present from about 11% to about 88% by weight of said polymer of said

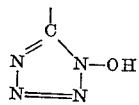

substituents.

6. A process comprising the steps of
(1) bringing together and reacting a polymeric unit defined by the following structure

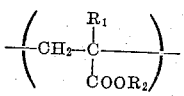

wherein $R_1$ is selected from the group consisting of hydrogen and hydrocarbon radicals having from one to four carbon atoms and $R_2$ is a hydrocarbon radical having from one to 18 carbon atoms and hydroxylamine at temperatures between about 20° C. and 70° C. in at least stoichiometric amounts thereby forming the corresponding polyhydroxamic acid, there being present from about 11% to about 88% by weight of said polyester of said hydroxamic acid substituents, (2) bringing together and reacting the resulting polyhydroxamic acid and thionyl chloride at temperatures between about 10° C. and 60° C. in at least stoichiometric amounts thereby forming the corresponding polyhydroxamic chloride, (3) bringing together and reacting the resulting polyhydroxamic chloride and a member of the group consisting of hydrazine and hydrazine hydrate at temperatures between about 0° C. and 20° C. in approximately stoichiometric amounts thereby forming the corresponding polyhydrazide oxime, and thereafter (4) bringing together and reacting the resulting polyhydrazide oxime with nitrous acid at temperatures between about −5° C. to +10° C. thereby obtaining the corresponding poly 1-hydroxy, 5-tetrazole.

7. Salts of the polymer of claim 1.
8. The copper salt of the polymer of claim 1.
9. The silver salt of the polymer of claim 1.
10. A polymer containing

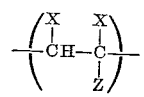

wherein:

$x$ is selected from the group consisting of H, CN, hydrocarbon substituents having from 1 to 4 carbon atoms and

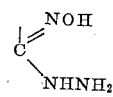

$y$ is selected from the group consisting of H, CN and

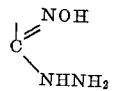

and Z is selected from the group consisting of CN, $OCH_2CH_2CN$ and

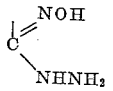

with the proviso that (a) no more than two of $x$, $y$ and $Z$ are CN and (b) when $x$ is a hydrocarbon substituent having from 1 to 4 carbon atoms, $y$ is H, there being present in said polymer from about 11% to about 88% by weight of said polymer of

substituents.

11. A polymer having a plurality of

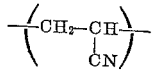

groups, wherein some of said CN substituents have been converted to

substituents, there being present from about 11% to about 88% by weight of said polymer of said

substituents.

12. A polyester having a plurality of

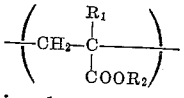

groups wherein $R_1$ is selected from the group consisting of hydrogen and hydrocarbon radicals having from one to four carbon atoms and $R_2$ is a hydrocarbon radical having from one to 18 carbon atoms, at least some of said —$COOR_2$ substituents being converted to

substituents, there being present from about 11% to about 88% by weight of said polymer of

substituents.

13. A polymer having a plurality of

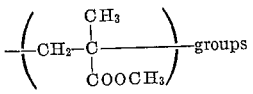 —groups wherein some of said —COOCH₃ substituents have been converted to

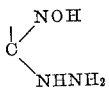

substituents, there being present from about 11% to about 88% by weight of said polymer of

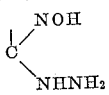

substituents.

14. The polymer of claim 10 wherein there is present from about 20% to about 80% by weight thereof of

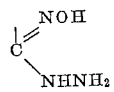

substituents.

15. Salts of the polymer of claim 10.
16. The copper salt of the polymer of claim 10.
17. A process comprising the steps of
(1) bringing together and reacting a polymeric unit defined by the following structure

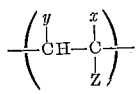

wherein $x$ is selected from the group consisting of H, CN

and hydrocarbon substituents having from 1 to 4 carbon atoms; $y$ is selected from the group consisting of H, CN and

and Z is selected from the group consisting of CN, OCH₂CH₂CN and

with the proviso that (a) no more than two of $x$, $y$ and Z are CN and (b) when $x$ is a hydrocarbon substituent having from 1 to 4 carbon atoms, $y$ is H, there being present in said polymer from about 11% to about 88% by weight of said polymer of

substituents, and thionyl chloride at temperatures between about 10° C. and 70° C. in least stoichiometric quantities thereby forming the corresponding polyhydroxamic chloride, and (2) thereafter bringing together the resulting polyhydroxamic chloride and a member of the group consisting of hydrazine and hydrazine hydrate in approximately stoichiometric quantities at a temperature between about 0° C. and 20° C. thereby obtaining the corresponding polyhydrazide oxime.

18. A polymer having a plurality of

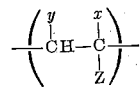

groups wherein:

$x$ is selected from the group consisting of H, CN, hydrocarbon substituents having from 1 to 4 carbon atoms and

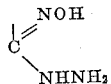

$y$ is selected from the group consisting of H, CN and

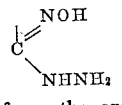

and Z is selected from the group consisting of CN, OCH₂CH₂CN and

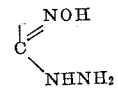

with the proviso that (a) no more than two of $x$, $y$ and Z are CN and (b) when $x$ is a hydrocarbon substituent having from 1 to 4 carbon atoms, $y$ is H, said polymer originally containing at least about 10% by weight of nitrile substituents, there being present in said polymer from about 11% to about 88% by weight of said polymer of

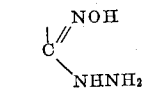

substituents.

References Cited

UNITED STATES PATENTS

| 3,004,959 | 10/1961 | Finnegan et al. | 260—88.3 |
| 3,013,001 | 12/1961 | Lynn | 260—80.3 |
| 3,063,951 | 11/1962 | Schouteden | 260—88.7 |
| 3,096,312 | 7/1963 | Henry | 260—88.7 |

FOREIGN PATENTS 730,032  5/1955  Great Britain.

OTHER REFERENCES

Bennett: "Concise Chemical and Technical Dictionary," Chemical Publishing Co., Inc., New York (1947), p. 745 (copy in Group 140), QD 5B4C.5.

Elpern et al.: Chem. Abs., 52 (1958), p. 9091 (d).

JOSEPH L. SCHOFER, Primary Examiner.

DONALD E. CZAJA, Examiner.

H. WONG, Assistant Examiner.